United States Patent [19]

Granger et al.

[11] 3,778,971
[45] Dec. 18, 1973

[54] DEVICE FOR PURGING GAS FROM A LIQUID

[75] Inventors: Alain Granger, Lesigny; Andre Sausse, Sceaux, both of France

[73] Assignee: Rhone-Poulenc S.A., Paris, France

[22] Filed: Sept. 29, 1971

[21] Appl. No.: 184,890

[30] Foreign Application Priority Data

Sept. 29, 1970 France .............................. 7035149

[52] U.S. Cl. ................................................. 55/159
[51] Int. Cl. ............................................... B01d 19/00
[58] Field of Search ..................... 55/16, 158, 159; 210/321; 23/258.5; 195/1.8

[56] References Cited
UNITED STATES PATENTS

| 3,631,654 | 1/1972 | Riely | 55/159 |
| 3,651,616 | 3/1972 | Blanchard et al. | 55/16 |
| 3,523,408 | 8/1970 | Rosenberg | 55/159 |
| 3,567,028 | 3/1971 | Nose | 210/321 |
| 3,501,010 | 3/1970 | Critchell et al. | 210/321 |
| 3,614,856 | 10/1971 | Sani et al. | 55/16 |

*Primary Examiner*—Charles N. Hart
*Attorney*—Stevens, Davis, Miller & Mosher

[57] ABSTRACT

A device for purging gas bubbles from a liquid in which a wall is arranged to form a passageway, at least half of the wall being in the form of a hydrophobic porous membrane having a pore size between 0.01 to $30\mu$. The liquid flows parallel to the membrane in a passageway between 0.5 and 10 mm maximum thickness and the gas escapes through the pores. The membrane may be formed into a tube and may act as a connector between two lengths of piping, the gas escaping between the ends of the piping. In another construction the device is in the form of a sachet having an intermediate impermeable wall, the liquid being caused to flow parallel to the sides of the wall of the sachet.

2 Claims, 3 Drawing Figures

PATENTED DEC 18 1973

3,778,971

DEVICE FOR PURGING GAS FROM A LIQUID

The present invention relates to a device for purging gas from a liquid.

The presence of gas bubbles in a liquid, and above all in a stream of liquid, is generally undesirable. These bubbles cause turbulence, falsify the readings of measuring apparatuses, interfere with flow rates and cause various other mechanical, physical or chemical occurrences. Each time a liquid, including blood, is introduced into the vascular system, the removel of bubbles is absolutely essential to avoid a gas embolism.

Hence, a multitude of apparatuses exists which use the movement of a float to control either the removal of the gas or the stopping of the stream of liquid, or an alarm device. These devices are known as purging devices, bubble traps or bubble removers.

These apparatuses, have various disadvantages: they use moving components and are hence subject to wear and therefore to blockages or to untimely breakages; they are frequently not leakproof; and they only operate in the position determined by the movement of the float.

On the other hand, a so-called "purging filter" apparatus for removing the bubbles contained in a liquid is known.

In this apparatus the liquid passes through a hydrophilic filter which stops the bubbles, the bubbles thus stopped collect against a hydrophobic porous membrane, and the gas is removed across the latter.

This apparatus unfortunately causes a filtration of the liquid and it is known that it is frequently of value, especially for biological liquids, to avoid the disturbances resulting from a filtration.

According to the invention, there is provided a device for purging gas bubbles from a liquid, such device comprising a wall defining a substantially unobstructed liquid passageway, at least 50 percent of the said wall being in the form of a hydrophobic porous membrane, the pores of which have an apparent diameter of 0.01 to 30 $\mu$ and preferably of 0.01 to 10 $\mu$ the maximum thickness of the passageway, measured perpendicular to the porous membrane, being between 0.5 and 10 mm, the inner surface of the membrane, in contact with the liquide flowing through the passageway, having a surface tension of less than 40 dynes/cm.

Such a device allows bubbles contained in a liquid to be removed without having to require the liquid to undergo a decantation of filtration, and avoids the presence of components undergoing mechanical movements.

Where the degassing of aqueous liquids is concerned, the material of which the partition component consists can be water-repellent by nature or rendered water-repellent by any known-treatment so that it has a critical surface tension of less than 40 dynes/cm at 20°C. [defined, for example, by R. L. Patricks: Treaties on Adhesion and Adhesives (1967) p. 171-175].

As examples of materials which can be used in the presence of aqueous liquids there may be mentioned polytetrafluoroethylene, polyvinyl chloride, polyethylene and polyacrylonitrile which has beforehand been brought into a porous form by an appropriate treatment, for example, by sintering, coagulation or extraction of soluble products incorporated in it. Those of the materials mentioned which have a critical surface tension of less than 40 dynes/cm (for example polytetrafluoroethylene, polyethylene or polyvinyl chloride) can be used as they are. For the others (for example polyacrylonitrile) a waterproofing treatment must be carried out.

These materials can be used by themselves or combined with a support such as a fabric.

It is also possible to use a fibrous material, for example a sheet of porous paper with water-repellent fibres. Preferably, a sheet obtained from polynosic fibres (micro-fibrillar regenerated cellulose fibres of gauge 0.4 denier and length 20 to 30 mm) is employed. The manufacture of this paper is described in French Pat. No. 1,272,081. The pores of this paper have the advantage of possessing uniform dimensions equivalent to a diameter of the order of 0.05 $\mu$.

The waterproofing composition required with certain hydrophilic materials can be selected from amongst the known compositions; it can, in particular, be based on organosilicon compounds or on fluorinated polymers. Preferably, an organopolysiloxane composition which can be vulcanised to an elastomer at ambient temperature is employed. Such compositions are described, for example, in French Pat. No. 1,198,749. The critical surface tension of the organopolysiloxane elastomers is around 20–25 dynes/cm. It should be noted that the waterproofing composition must not block the pores of the membrane but must simply line them so as to prevent the penetration of the liquid into the pores under the influence of capillarity.

The waterproofing treatment can be carried out by simple immersion of the porous support into a solution of the waterproofing composition in an appropriate diluent, the nature of this diluent being connected with that of the waterproofing composition and of the porous support; the concentration of the solution, the duration of immersion and the number of dips into this solution — or the speed of travel through the solution if the impregnation is carried out continuously — lie within the scope of those skilled in the art, the essential feature being that the waterproofing composition should not block the pores, which can easily be checked by gas permeability tests.

The liquid passageway is made up in the usual fashion and can be in any appropriate form such as tubular or rectangular.

The partition component consisting of the hydrophobic microporous membrane can form all or part of the external surface of the passageway.

The shape of the cross-section of this passageway in the part comprising the micro-porous membrane must be such that no point of this section should be at a distance of more than 0.05 to 10 mm., and preferably of 1 to 4 mm., from the membrane.

The apparatus is so constituted that the general direction of flow of the liquid adjacent the membrane is essentially parallel to the latter.

The mechanical strength of the purging device must evidently be proportional to the pressure of the liquid to be degassed, and can be increased by any suitable reinforcement, for example, a textile reinforcement, a woven metal sleeve, a sintered metal casing or a perforated metal sheet. This reinforcement can furthermore protect the purging device against various contaminations or external changes. Equally, the difference in pressure between the two sides of the membrane of the purging device must obviously lie between zero and the pressure at which the liquid starts to pass through the pores. A negative relative pressure would have the effect of injecting bubbles into the liquid. The appropriate maximum pressure depends on the liquid and on the material present, and on the diameter of the pores. Its adjustment lies within the scope of those skilled in the art and it is made once-for-all by means of a routine test. The purging device can optionally be contained in a gas chamber which is at a pressure below that of the liquid and either intermediate between that of the liquid and atmospheric pressure or below both that of the liquid and atmoshperic pressure.

The surface area of the partition component consisting of the micro-porous membrane must naturally be suited to the flow rate of the liquid to be treated. It obviously varies in accordance with the volume of gas to be removed. The characteristics of the materials allow the surface area to be adapted to each particular case.

Since the purging device according to the invention is principally intended for the treatment of liquids only contain a few bubbles, a membrane surface area of between 1 and 10 cm$^2$ per ml/min. of liquid flow very generally proves satisfactory.

A purging device according to the invention is more effective than a mechanical purging device, at least in the case of liquids travelling at speeds of less than about 1 m/second; in effect, a gas bubble which comes into contact with the micro-porous partition sticks thereto immediately and rapidly diffuses outwards instead of being recirculated by turbulence before having reached the decantation surface of mechanical purging device. The absence of movable components eliminates the dangers of contamination by various waste materials (abrasion, or lubricant) and of defective operation. The possibility of using a tubular shape reduces the pressure losses and the elimination of a decantation zone avoids stagnation of the liquid.

Naturally, the purging device according to the invention itself has limitations: it cannot, by itself, resist a massive influx of gas, greater than its proper flow rate. On the other hand, it can be combined with a bubble trap, for example of the float type, the operation of which it renders independent.

In order that the invention may more readily be understood, the following description is given, merely by way of example, reference being made to the accompanying drawings, in which.

EXAMPLE I

Figure 1:
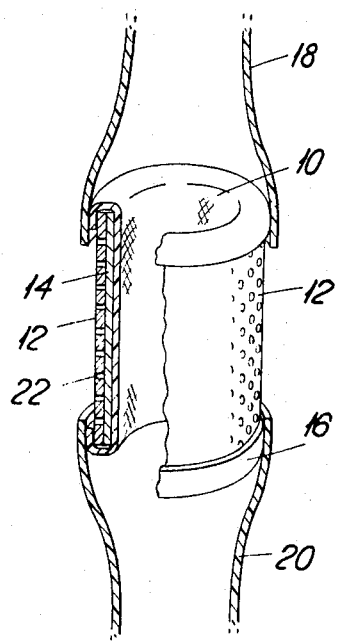
FIG. 1 is a perspective sectional view of one embodiment of device according to the invention.

The construction of this example is shown in FIG. 1. The device illustrated includes a tubular film 10 of micro-porous polyvinyl chloride (thickness 70 $\mu$) having an average apparent diameter of the pores of 0.1 $\mu$ the film being reinforced with a woven fabric of stiff nylong 66 filament comprising 90 stiff filaments of 30 $\mu$ dia. per cm. This tubular membrane is 10 mm. in diameter and 5 cm. in length and is inserted in a perforated aluminium tube 12 which is 12 mm. in diameter and 4 cm. in length. A sleeve 14 of filter paper is interposed between the membrane and the perforated aluminium tube. The end protions 16 of the membrane are folded over the ends of the perforated metal tube 12 and an inlet silicon elastomer tube 18 and a similar outlet tube 20 are placed over the folded over portions.

To demonstrate the effectiveness of the device, a few bubbles of air were introduced into the feed tube and the tube was shaken so as to cause the bubbles to move to the purging device, the liquid issuing therefrom no longer contained bubbles. It will be appreciated that the liquid passes substantially parallel to the surface of the membrane 10 and that the gaz bubbles pass through the pores thereof and through the perforations 22 in the tube 12 to issure to atmosphere.

EXAMPLE II

Figure 2:
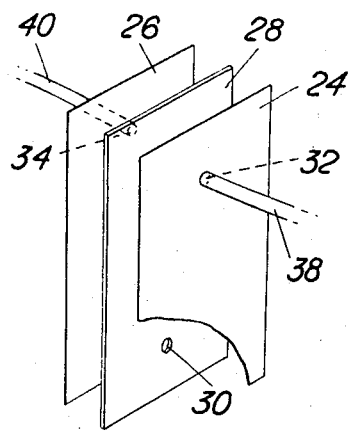
FIG. 2 is a perspective exploded view of a second embodiment of device according to the invention.
Figure 3:
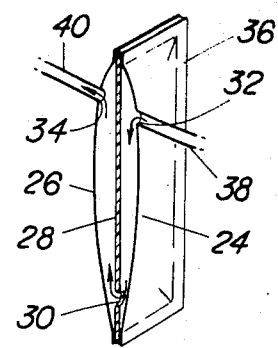
FIG. 3 is a perspective view of the device of FIG. 2 in assembled condition.

The device of this example is illustrated in FIGS. 2 and 3. In this construction two sheets 24 and 26 of the same membrane as referred to in Example I and a third sheet 28 of polyvinyl chloride are superimposed upon one another, the sheets each being 150 mm. long and 30 mm. wide. The third sheet was provided with an aperture 30 near its bottom edge and the two sheets 24 and 26 were provided with inlet apertures 32 and 34. The three sheets were welded together around their entire periphery 36 to provide, effectively, a double walled sachet, thus producing a U-shaped passageway, liquid being introduced through the inlet pipe 38 connected to the aperture 32 and leaving through the outlet pipe 40 connected to the aperture 34.

An experiment was carried out in which the blood of an animal was ultra filtered by means of an apparatus which comprises a filtration unit in which the blood of the animal circulates. About 15 ml/minute of serum ultra filtrate was withdrawn by means of a suction generating pump and in order to achieve this flow rate it was necessary to apply strong suction (about 300 mm of Hg). Gas bubbles were then observed originating either from degassing of the liquid or from the circuit being insufficiently leakproof. The ultra-filtrate thus collected underwent various treatments intended to remove the waste products which it contained and it was then re-injected into the vein of an animal. It was, of course, essential to degas this liquid continuously before it was re-injected.

For this purpose the device of FIGS. 2 and 3 was used being placed in the reinjection line about 20 cm. below the animal. It was then obeserved that all the air carried by the liquid, representing about 10 ml of air per min. fora liquid flow rate of about 15 ml/min. was removed. If, for any reason, only the air flow continues, it was found that the back-pressure of 20 cm. of water was sufficient to cause about 20 ml/min., of air to diffuse across the membrane. Good operation was ensured regardless of the position of the purging device.

We claim:

1. A device for purging gas bubbles from a liquid travelling through said device, said device comprising
    wall means defining a liquid passageway,
    an unobstructed inlet to, and
    an unobstructed outlet from said passageway,
    a liquid flow path defined through said passageway between said inlet and said outlet,
    hydrophobic porous membrane comprising at least 50 percent of said wall means and extending parallel to said liquid flow path,
    pores in said membrane having an apparent diameter of 0.01 to 30 microns and
    an inner surface of said membrane having said members having surface tension less than 40 dynes/cm, said passageway having a thickness perpendicular to said flow path and said membrane of between 0.5 and 10 mm, wherein said wall means comprises two sheets of said hydrophobic porous membrane and a further sheet of liquid impermeable material interposed therebetween, said three sheets being superimposed upon one another in overlying relationship, a periphery of each of said sheets, all of said peripheries being secured together, and wherein said unobstructed inlet comprises means defining a liquid inlet aperture near one edge of one of said membranes and said unobstructed outlet comprises means defining a liquid outlet aperture adjacent said one edge of the other of said porous membranes, and including means defining a further aperture in said further sheet adjacent an opposite edge thereof whereby a "U" shaped passageway is provided in said device.

2. In a device for purging gas bubbles from blood travelling through said device, said device comprising wall means defining a passageway, an inlet to and an outlet from said passageway, a flow path defined through said passageway between said inlet and said outlet, a hydrophobic porous membrane comprising at least 50 percent of said wall means and extending parallel to said flow path, pores in said membrane having an apparent diameter of 0.01 to 30 microns, an inner surface to said membrane having a surface tension less than 40 dynes/cm, the improvements of providing said passageway in unobstructed form such that said flow path is free from filtering devices, said passageway having a thickness perpendicular to said flow path and said membrane of between 0.5 and 10 mm, said membrane having an area of between 1 and 10cm$^2$/ml/min of intended blood flow, and said device comprising two sheets of said hydrophobic porous membrane and a further sheet of liquid impermeable material interposed therebetween, said three sheets being superimposed upon one another in overlying relationship, a periphery to each of said sheets, all of said peripheries being secured together, means defining an inlet aperture for blood near edge of one of said membranes and means defining an outlet aperture for blood adjacent one edge of the other of said porous membranes and means defining a further aperture and the further sheet adjacent an opposite edge thereof whereby a "U" shaped passageway is provided in said device.

\* \* \* \* \*